June 6, 1950  C. A. ESCOFFERY ET AL  2,510,092
RECTIFIER
Filed Feb. 1, 1947
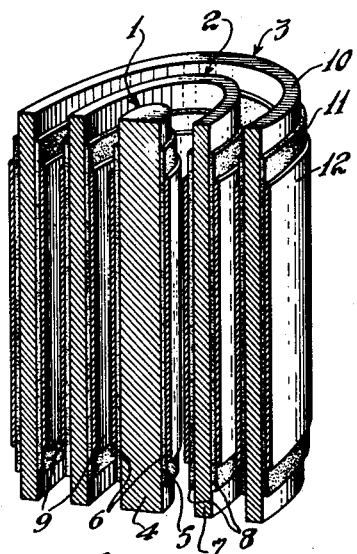
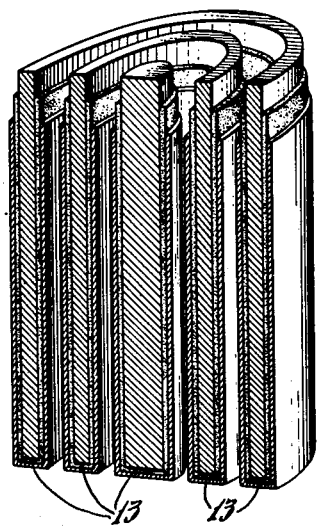
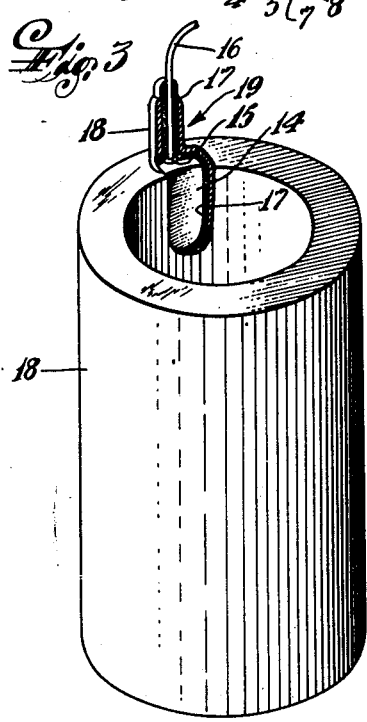
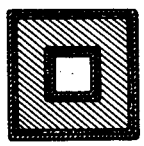
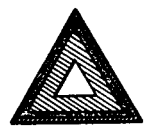
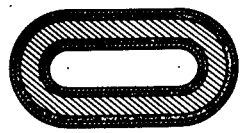
INVENTORS.
Charles A. Escoffery
BY Walter H. Hawk
Percy P. Lantz
ATTORNEY Patented June 6, 1950

2,510,092

UNITED STATES PATENT OFFICE 2,510,092

RECTIFIER

Charles A. Escoffery and Walter H. Hawk, East Orange, N. J., assignors to Federal Telephone and Radio Corporation, New York, N. Y., a corporation of Delaware Application February 1, 1947, Serial No. 725,760

1 Claim. (Cl. 175—366)

The present invention relates to metal contact type rectifiers and, more particularly, to improvements in the structure of dry rectifiers, especially selenium rectifiers.

One object of this invention is to provide compact metal-contact rectifiers of novel and utilitarian configurations.

A second object is to provide metal contact type rectifiers which may be easily mounted, to which electrical connections may be readily made and which may be efficiently cooled by natural ventilation or artificial cooling means.

An additional object is to provide selenium rectifiers, including hollow tubular rectifiers, having large rectifying and cooling areas in comparison with the volume and overall dimensions thereof.

Although selenium rectifiers are customarily constructed of stacks of flat disk-like rectifier units, such structures do not permit the use of a large percentage of the baseplate areas for rectifying and cooling purposes, nor may they be conveniently mounted and contacted electrically in many applications. These disadvantages are largely overcome by the rectifier arrangements of this invention which, in addition, may be simply manufactured from rod or tubular-shaped baseplate stock. Accordingly, practical embodiments of selenium rectifiers utilizing rod and hollow tubular configurations are disclosed herein.

These and other objects and features of the present invention will be disclosed in greater detail by the following description and discussion of preferred embodiments, reference being had to the drawings in which:

Figure 1 presents a half-sectional view of a rectifier unit incorporating a plurality of rectifier elements, and constructed in accordance with the principles of this invention;

Figure 2 depicts in half-section a rectifier unit incorporating a plurality of rectifier elements similar to those of Figure 1 except that each has its baseplate material uncoated at only one end;

Figure 3 shows a tubular rectifier which has substantially all baseplate surfaces covered with selenium and counterelectrode alloy; and Figures 4, 5 and 6 represent alternative tubular rectifier configurations in cross-section.

The selenium rectifier unit shown in half section in Figure 1 comprises a solid rod-shaped rectifier element generally designated by numeral 1, a hollow tubular rectifier element 2 substantially concentric and co-extensive with rectifier 1, and a second hollow tubular rectifier element 3 substantially concentric and coextensive with rectifiers 1 and 2. Element 1 includes a rod-shaped baseplate 4, a selenium coating 5 covering a major portion of this baseplate but leaving both ends uncoated, and an alloy counterelectrode coating 6 substantially covering the selenium coating without electrically contacting the baseplate. Rectifier element 2 is comprised of a hollow cylinder of baseplate material 7 having successive coatings of selenium 8 and counterelectrode material 9 on both the inner and outer surfaces thereof. And, rectifier element 3 includes the hollow cylinder of baseplate material 10 coated with selenium 11 and counterelectrode material 12 on the inner and outer sides of the baseplate material 10. Selenium and alloy coatings may be applied to the solid rod or hollow tubular baseplate material by any of well-known processes. Where these coatings are to be applied internally to a tubular baseplate the preferred process is electroplating, although conceivably dipping, spraying, electrostatic deposition, etc. may be utilized.

The three rectifier elements of Figure 1 are diagrammed in a concentric and coextensive arrangement which may be convenient when the elements are to be mechanically and electrically coupled together as a stock in series, parallel, or bridge rectifier arrangements. Any one of these elements may, of course, be used individually. Electrical contact with each of the elements used either separately or as shown in Figure 1 should be made to the baseplate material and to the counterelectrode alloy coating of each element. At least one end of each element is left uncoated in order that such contact with the baseplates may be conveniently made.

In Figure 1 both ends of the baseplates of the rectifier elements are left uncoated, but the showing of Figure 2 discloses an alternative arrangement in which only one end of the baseplate is left uncoated for contacting purposes and the other ends are doubly coated, that is, with selenium and the counterelectrode alloy to increase the rectifying surface area. Where mounting of these elements is accomplished such that a pressure contact is established with the alloy coating, it may be necessary to provide means to avoid shorting between the alloy coating and the baseplate material. To accomplish this, insulating material or an anodized layer may be provided on the baseplate between the alloy coating and the baseplate material, as indicated by numeral 13 in Figure 2.

When utilized as individual rectifiers, elements such as those shown in Figure 1 may be mounted in the manner disclosed by the copending application of Escoffery-Hawk, Ser. No. 702,518 filed Oct. 10, 1946, now Patent No. 2,498,666, issued February 28, 1950. The hollow cylindrical elements, in addition to being advantageous from the viewpoint of convenience for mounting, have the advantage of greater rectifying and cooling or ventilating area over what could be obtained with solid baseplate material. Although it was preferred to illustrate the baseplate with a circular cross-section in Figures 1, 2 and 3, the invention is not limited to any specific cross-sectional configuration and conductive materials having many different cross-sectional shapes are commercially available for use in accordance with this invention. Such alternative rectifier and baseplate cross-sections are illustrated by the substantially rectangular, triangular, and elliptical showings of Figures 4, 5 and 6 respectively. It should be noted that the baseplate of the rectifier in Figure 5 is coated only on the outer surface.

When it is desirable to utilize substantially all the available baseplate area for rectifying purposes, an arrangement such as that illustrated in Figure 3 may be utilized. The tubular cylindrical baseplate 14 has bonded thereto at 15 a conductive lead or extension 16 which serves as the electrical terminal for baseplate 14. Selenium is applied as a layer 17 to the entire baseplate surface, both inside and out, and over a portion of the extension 16. An alloy counterelectrode coating 18 covers substantially all of the selenium layer. At the position designated generally by numeral 19, the selenium and counterelectrode coatings are shown broken away to facilitate the disclosure of the manner in which extension 16 is joined with baseplate 14. Although the extension has been illustrated at one end of the hollow tubular baseplate, it may, of course, be bonded with any other part of the baseplate surface and may be uncoated.

In addition to contributing the important advantage of a large ratio of rectifying area to rectifier unit volume, the dry rectifiers of the present invention permit an increase in rectifier efficiency through improved cooling, either natural or artificial. It should be apparent that, when hollow cylindrical rectifiers are used individually, the internal apertures whether coated for rectifying purposes or not, allow natural circulation of air therethrough and thereby reduce the rectifier temperature and increase the power ratings of the selenium rectifiers. Likewise, in the case of concentrically arranged units such as those of Figures 1 and 2, the natural ventilation provided increases the power handling capacities. It may also be desirable in certain applications to artificially ventilate the rectifiers, and this may be accomplished by blowing air or forcing fluid coolants, such as oil, through the inter-unit apertures of a multi-unit concentric stack or simply through the central aperture of an individual unit. The rectifiers diagrammed are all especially suited for cooling in the foregoing manner, and the importance of this natural or artificial ventilation is emphasized by the fact that selenium rectifier power handling capacities are limited only by the temperatures which the rectifier components can endure.

It should be apparent that numerous additional adaptations and modifications of metal contact rectifiers may be devised by those skilled in the art which, although differing superficially from those particular embodiments chosen for illustration herein, are not beyond the scope and principles of this invention. For example, the rod or hollow tubular rectifiers need not extend linearly but may be formed into any desired configuration, as a U-shape. The baseplate material of the rod or hollow tubular rectifiers may be uncoated at only one end, or at both ends, depending upon specific requirements and hollow rectifiers may be coated either externally or internally, or both. Dimensions of baseplate materials may of course vary, cross-sectional configurations of any of the rectifiers and their baseplates may be of any form, and the completed rectifiers may be mounted, singly or in groups, and electrically contacted in any convenient position and by any suitable means.

Therefore, although the present invention has been described in detail with reference to the foregoing preferred embodiments, it should be recognized that this has been done primarily for the purpose of illustration and the scope of the invention should not be considered limited thereby.

We claim:

A selenium rectifier unit comprising at least two coaxially arranged rectifier elements, each element including a conductive base plate in the form of a hollow cylinder, a semi-conductive layer of selenium on certain surfaces of said base plate, and counterelectrode material covering a substantial portion of said semi-conductive layer.

CHARLES A. ESCOFFERY.
WALTER H. HAWK.

REFERENCES CITED

The following references are of record in the file of this patent:

UNITED STATES PATENTS

| Number | Name | Date |
|---|---|---|
| 1,797,587 | Peter | Mar. 24, 1931 |
| 1,842,212 | Slepian | Jan. 19, 1932 |
| 2,162,740 | Mirick | June 20, 1939 |
| 2,189,617 | Siebert et al. | Feb. 6, 1940 |
| 2,359,801 | Skinker | Oct. 10, 1944 |